T. EVANS.
CONSTRUCTION OF EARS FOR CAN AND KETTLE BAILS.
No. 76,728. Patented Apr. 14, 1868.
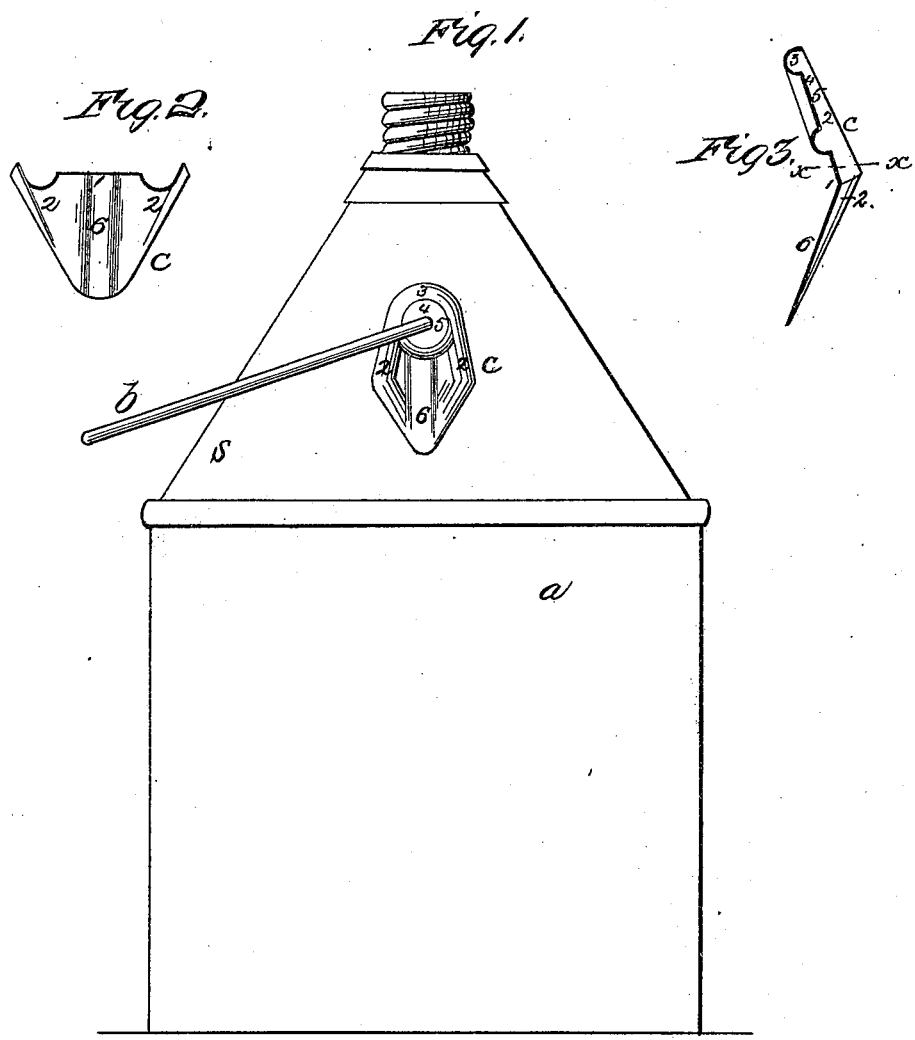

UNITED STATES PATENT OFFICE.

THOMAS EVANS, OF NEWARK, NEW JERSEY.

IMPROVEMENT IN THE CONSTRUCTION OF EARS FOR CAN AND KETTLE BAILS.

Specification forming part of Letters Patent No. 76,728, dated April 14, 1868.

*To all whom it may concern:*

Be it known that I, THOMAS EVANS, of Newark, in the county of Essex and State of New Jersey, have invented, made, and applied to use a certain new and useful Improvement in Ears for Can and Kettle Bails; and I do hereby declare the following to be a full, clear, and exact description of the said invention, reference being had to the annexed drawings, making part of this specification, wherein—

Figure 1 is a view of my improved ear as applied to a can. Fig. 2 is a section of said ear detached at the line $x\,x$; and Fig. 3 is a similar view, vertically, through said ear.

Similar marks of reference denote the same parts.

Ears for cans and kettles have heretofore been made out of sheet metal and soldered upon the inclined surface of the said can or kettle; but the same are not stiff and they easily become broken, besides which the appearance of said ears is in no respect ornamental.

The nature of my said invention consists in a sheet-metal ear for a can or kettle formed with a base portion bent at an angle to the upper portion and corrugations formed along the sides and end of said ear, so as to stiffen the same and render it better adapted to use, and giving to said ear an ornamental appearance. This ear is a new and useful article of manufacture.

In the drawings, $a$ represents the can, and $b$ the bail. These may be of any desired character. $c$ is my improved ear, formed with a bend at 1 between the base and upper part of the ear. 2 is a corrugation running along near the edges of the ear and around the end at 3. 4 is a circular corrugation around the hole 5, that receives the bail $b$. A corrugation, 6, running along the central part of the base of the ear and ending in the vertical portion of the ear, aids in stiffening the said ear. The ears formed with corrugations, as aforesaid, are to be soldered or riveted upon the inclined surface of the can or kettle.

I do not herein claim a circular eye countersunk and adapted to being soldered upon the side of a pail or bucket.

What I claim, and desire to secure by Letters Patent, is—

The ear for the bail of cans or kettles formed with corrugations, as and for the purposes set forth.

In witness whereof I have hereunto set my signature this 15th day of April, 1867.

THOS. EVANS.

Witnesses:
CHAS. H. SMITH,
FRANCIS A. EVANS.